(12) United States Patent
Gemello et al.

(10) Patent No.: US 7,376,558 B2
(45) Date of Patent: May 20, 2008

(54) NOISE REDUCTION FOR AUTOMATIC SPEECH RECOGNITION

(75) Inventors: Roberto Gemello, Turin (IT); Franco Mana, Turin (IT)

(73) Assignee: Loquendo S.p.A., Turin (IT)

( * ) Notice: Subject to any disclaimer, the term of this patent is extended or adjusted under 35 U.S.C. 154(b) by 4 days.

(21) Appl. No.: 11/598,705

(22) Filed: Nov. 14, 2006

(65) Prior Publication Data
US 2007/0260454 A1  Nov. 8, 2007

(51) Int. Cl.
G10L 21/02 (2006.01)
G10L 15/20 (2006.01)

(52) U.S. Cl. .................. 704/226; 704/233
(58) Field of Classification Search ............. None
See application file for complete search history.

(56) References Cited

U.S. PATENT DOCUMENTS 5,012,519 A * 4/1991 Adlersberg et al. ......... 704/226

(Continued)

FOREIGN PATENT DOCUMENTS

WO  WO 01/52242 A1  7/2001

OTHER PUBLICATIONS

Kato, et al., "A Wideband Noise Suppressor for the AMR Wideband Speech CODEC", Speech CODEC, IEEE Workshop Proceedings, XP010647245, Chapter 2, pp. 156-158, (Oct. 9, 2002).

(Continued)

*Primary Examiner*—David Hudspeth
*Assistant Examiner*—Brian Albertalli
(74) *Attorney, Agent, or Firm*—Finnegan, Henderson, Farabow, Garrett & Dunner, L.L.P.

(57) ABSTRACT

Disclosed herein is a noise reduction method for automatic speech recognitionl. A noise reduction method for automatic speech recognition, including: computing a magnitude spectrum of a noisy speech containing a clean speech to be recognized and noise affecting the clean speech; computing a power spectrum of the noisy speech; computing an estimate of a power spectrum of the clean speech; computing an estimate of a power spectrum of the noise; computing an estimate of an a priori signal-to-noise ratio as a function of the estimate of the power spectrum of the clean speech and the estimate of the power spectrum of the noise; computing an estimate of an a posteriori signal-to-noise ratio as a function of the power spectrum of the noisy speech and the estimate of the power spectrum of the noise; computing an attenuation gain as a function of the estimate of the a priori signal-to-noise ratio and the estimate of the a posteriori signal-to-noise ratio; and computing an estimate of a magnitude spectrum of the clean speech as a function of the magnitude spectrum of the noisy speech and the attenuation gain. Computing the estimates of the a priori and the a posteriori signal-to-noise ratios includes computing a noise weighting factor for weighting the estimate of the power spectrum of the noise in the computation of the estimates of the a priori and the a posteriori signal-to-noise ratios; computing a spectral flooring factor for flooring the estimates of the a priori and the a posteriori signal-to-noise ratios; and computing the estimates of the a priori and the a posteriori signal-to-noise ratios also as a function of the noise weighting factor and the spectral flooring factor.

13 Claims, 6 Drawing Sheets

U.S. PATENT DOCUMENTS

| | | | | |
|---|---|---|---|---|
| 6,088,668 | A | * | 7/2000 | Zack .......................... 704/225 |
| 6,604,071 | B1 | * | 8/2003 | Cox et al. ................... 704/225 |
| 6,643,619 | B1 | * | 11/2003 | Linhard et al. ............. 704/233 |
| 6,778,954 | B1 | * | 8/2004 | Kim et al. .................. 704/226 |
| 2002/0002455 | A1 | | 1/2002 | Accardi et al. |

OTHER PUBLICATIONS

Martin, et al., "Optimized Estimation of Spectral Parameters for the Coding of Noisy Speech", International Conference on Acoustics, Speech and Signal Processing, ICASSP 2000, XP010507630, vol. 3, pp. 1479-1482, (Jun. 5, 2000).

Ephraim, et al., "Speech Enhancement Using a Minimum Mean-Square Error Log-Spectral Amplitude Estimator", IEEE Transactions on Acoustics, Speech and Signal Processing, IEEE Inc. New York, US, vol. ASSP-33, No. 2, XP000931203, pp. 443-445, (Apr. 1985).

Schwab, et al., "Robust Noise Estimation Applied to Different Speech Estimators", ASILOMAR Conference on Signals, Systems and Computers, New York, NY, IEEE, US, vol. 1 of 2, Conf. 37, XP010701031, pp. 1904-1907, (Nov. 9, 2003).

Medina, et al., "Robust Speaker Verification in Colored Noise Environment", ASILOMAR Conference on Signals, Systems and Computers, New York, NY, IEEE, US, vol. 1 of 2, Conf. 37, XP010702165, pp. 1890-1893, (Nov. 9, 2003).

Schless, et al., "SNR-Dependent Flooring and Noise Overestimation for Joint Application of Spectral Subtraction and Model Combination", ICSLP 1998, XP007000096, (4) pages, (Oct. 1998).

* cited by examiner

NOISE REDUCTION FOR AUTOMATIC SPEECH RECOGNITION

TECHNICAL FIELD OF THE INVENTION

The present invention relates in general to noise reduction for automatic speech recognition, and in particular to a noise reduction method and system based on Spectral Attenuation Technique, and to an automatic speech recognition system.

BACKGROUND ART

Figure 1:
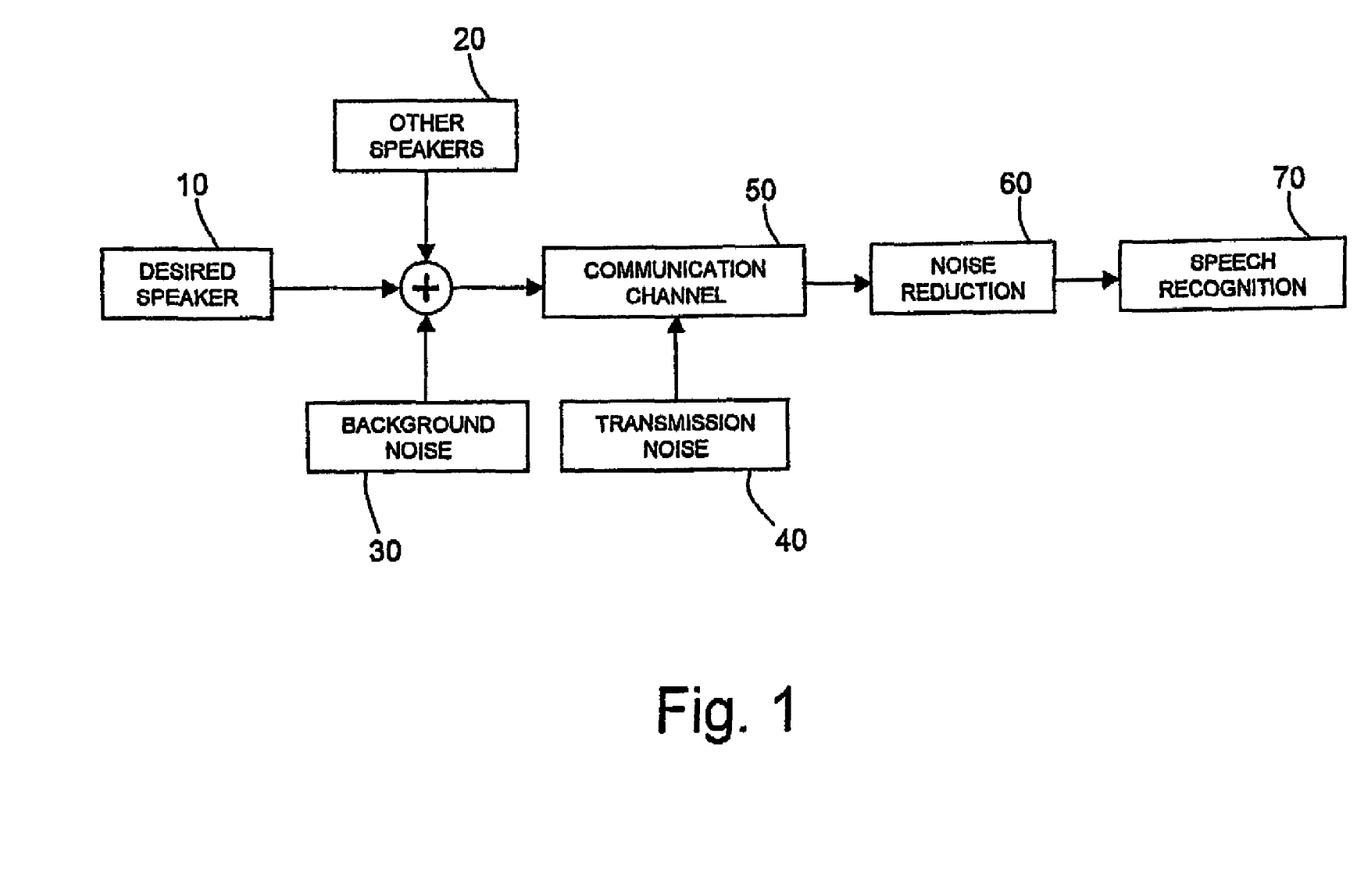
FIG. 1 shows a block diagram of common sources of speech degradation.

FIG. 1 shows a block diagram of common sources of speech degradation. As may be appreciated, speech from the desired speaker (block 10) is degraded by environmental noise, namely voices of other speakers nearby (block 20) and background noise (block 30), and by communication channel noise and distortion (blocks 40 and 50). Noise reduction techniques (block 60) for automatic speech recognition (block 70) can reduce the (nearly stationary) background noise and the channel noise, whereas non-stationary noise and interfering voices are much more difficult to be eliminated.

Figure 2:
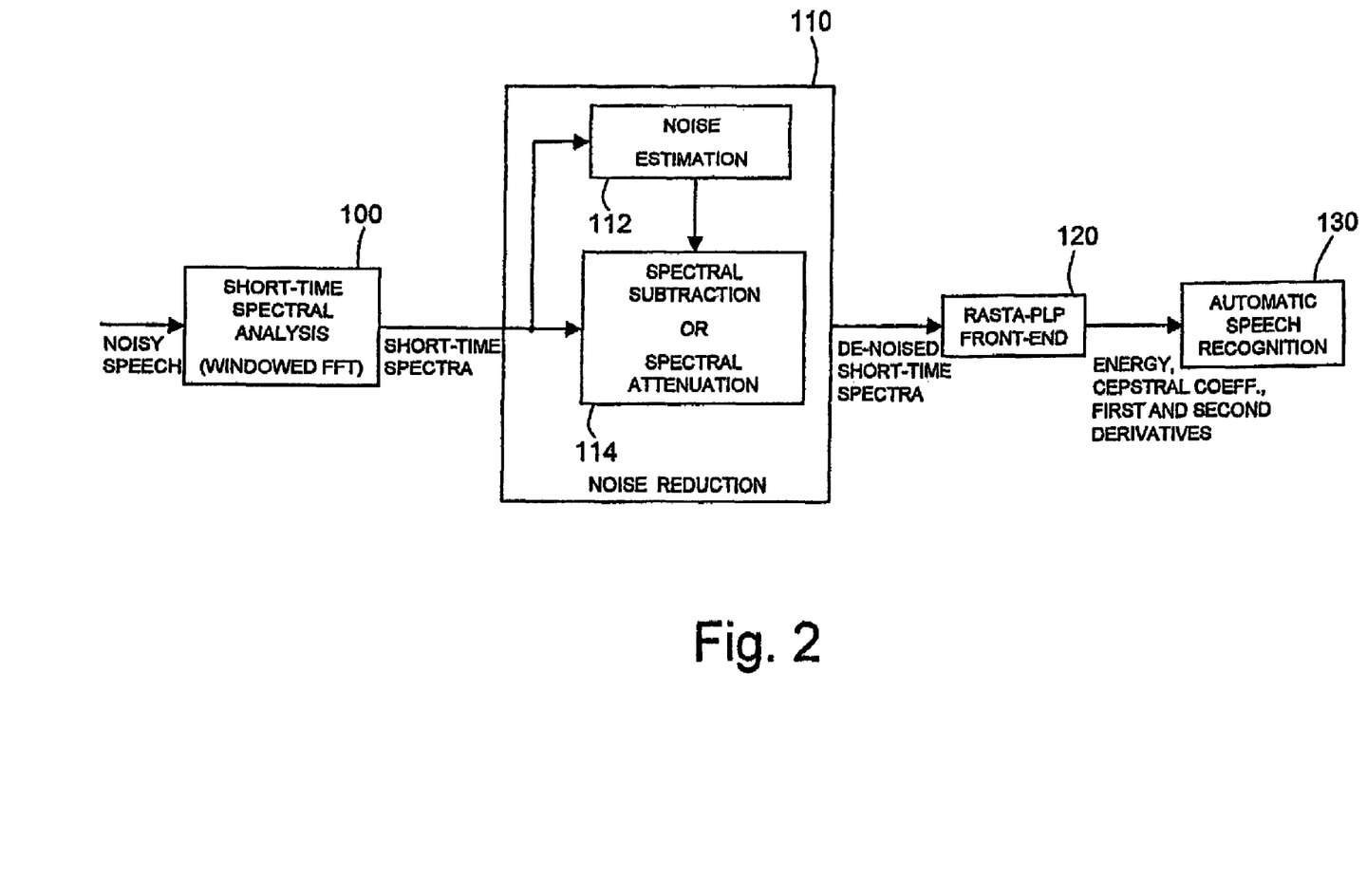
FIG. 2 shows a block diagram of noise reduction for automatic speech recognition.

FIG. 2 shows a block diagram of an automatic speech recognition system. As may be appreciated, the noisy speech to be recognized is inputted to a short-time spectral analysis (windowed FFT) block 100 which outputs short-time spectra which is in turn inputted to a noise reduction block 110. The de-noised short-time spectra are inputted to a RASTA-PLP Front-End 120, which outputs the total energy of the speech signal, the cepstral coefficients, and the first and second derivatives of the total energy and of the cepstral coefficients, which are all inputted to an automatic speech recognition block 130.

RASTA-PLP Front-End 120 implements a technique known as "RelAtive SpecTrAl Technique", which is an improvement of the traditional PLP (Perceptual Linear Prediction) method and consists in a special filtering of the different frequency channels of a PLP analyzer. The previous filtering is done to make speech analysis less sensitive to the slowly changing or steady-state factors in speech. The RASTA method replaces the conventional critical-band short-term spectrum in PLP and introduces a less sensitive spectral estimate. For a more detailed description of a RASTA processing, reference may be made to H. Hermansky and N. Morgan, *RASTA Processing of Speech, IEEE Transactions on Speech and Audio Processing*, Vol. 2 No. 4, October 1994.

The noise reduction block 110 performs an environmental noise estimate 112 based on the short-time spectra and then an environmental noise reduction 114 based on the short-time spectra and the estimated noise, by using either a so-called "Spectral Subtraction Technique" or a so-called "Spectral Attenuation Technique".

The aforementioned techniques will be described in detail hereinafter by denoting the power spectrum of the noisy speech by $|Y_k(m)|^2$, the power spectrum of the clean speech by $|X_k(m)|^2$, the power spectrum of the additive noise by $|D_k(m)|^2$, and the estimate of a quantity by symbol "^", and wherein k indexes the spectral lines of the spectra and m indexes the time windows within which the noisy speech is processed for noise reduction.

Spectral Subtraction Technique is described in N. Virag, *Single Channel Speech Enhancement Based on Masking Properties of the Human Auditory System*, IEEE Transaction on Speech and Audio Processing, Vol. 7, No. 2, March 1999, which deals with the problem of noise reduction for speech recognition and discloses the use of a noise overestimation or oversubtraction factor and a spectral flooring factor.

In particular, the Spectral Subtraction Technique is based on the principle of reducing the noise by subtracting an estimate $|\hat{D}_k(m)|^2$ of the power spectrum of the additive noise from the power spectrum $|Y_k(m)|^2$ of the noisy speech, thus obtaining an estimate $|\hat{X}_k(m)|^2$ of the power spectrum of the clean speech:

$$|\hat{X}_k(m)|^2 = \begin{cases} |Y_k(m)|^2 - \alpha(m)|\hat{D}_k(m)|^2 & \text{if } |Y_k(m)|^2 - \alpha(m)|\hat{D}_k(m)|^2 > \beta(m)|Y_k(m)|^2 \\ \beta(m)|Y_k(m)|^2 & \text{otherwise} \end{cases} \quad (1)$$

wherein $\alpha(m)$ is the noise overestimation factor, $\beta(m)$ is the spectral flooring factor.

In particular, the residual noise spectrum consists of peaks and valleys with random occurrences, and the overestimation factor $\alpha(m)$ and the spectral flooring factor $\beta(m)$ have been introduced to reduce the spectral excursions.

In detail, the overestimation factor $\alpha(m)$ has been introduced to "overestimate" the noise spectrum, i.e., in other words the overestimation factor $\alpha(m)$ subtracts an overestimation of the noise over the whole spectrum, whereas the spectral flooring factor $\beta(m)$ prevents the spectral lines of the estimate $|\hat{X}_k(m)|^2$ of the power spectrum of the clean speech from descending below a lower bound ($\beta(m)|Y_k(m)|^2$), thereby "filling-in" the deep valleys surrounding narrow peaks (from the enhanced spectrum). In fact, occasional negative estimates of the enhanced power spectrum can occur and in such cases, the negative spectral lines are floored to zero or to some minimal value (floor). Reducing the spectral excursions of noise peaks as compared to when the negative components are set to zero, reduces the amount of musical noise. Essentially by reinserting the broadband noise (noise floor), the remnants of the noise peaks are "masked" by neighboring components of comparable magnitude.

A variant of this technique in known as "Wiener Spectral Subtraction Technique", which is similar to the previous one but is derived from the optimal filter theory. The estimate $|\hat{X}_k(m)|^2$ of the power spectrum of the clean speech is the following:

$$|\hat{X}_k(m)|^2 = \begin{cases} \dfrac{\left[|Y_k(m)|^2 - \alpha(m)|\hat{D}_k(m)|^2\right]^2}{|Y_k(m)|^2} & \text{if } |Y_k(m)|^2 - \\ & \alpha(m)|\hat{D}_k(m)|^2 > \beta(m)|Y_k(m)|^2 \\ \beta(m)|Y_k(m)|^2 & \text{otherwise} \end{cases} \quad (2)$$

An improvement to the Spectral Subtraction Techniques is disclosed in V. Schless, F. Class, *SNR-Dependent flooring and noise overestimation for joint application of spectral subtraction and model combination*, ICSLP 1998, which proposes to make the noise overestimation factor $\alpha(m)$ and the spectral flooring factor $\beta(m)$ functions of the global signal-to-noise ratio SNR(m).

Spectral Attenuation Technique, instead, is based on the principle of suppressing the noise by applying a suppression rule, or a non-negative real-valued gain $G_k$, to each spectral line k of the magnitude spectrum $|Y_k(m)|$ of the noisy speech, in order to compute an estimate $|\hat{X}_k(m)|$ of the magnitude spectrum of the clean speech according to the following formula: $|\hat{X}_k(m)|=G_k(m)|Y_k(m)|$.

Many suppression rules have been proposed, and probably one of the most important rules is the so-called Ephraim-Malah spectral attenuation log rule, which is described in Y. Ephraim and D. Malah, *Speech Enhancement Using a Minimum Min-Square Error Log-Spectral Amplitude Estimator*, IEEE Transaction on Acoustics, Speech, and Signal Processing, Vol. ASSP-33, No. 2, pp. 443-445, 1985.

Ephraim-Malah gain $G_k(m)$ is defined as:

$$G_k(m) = \frac{\xi_k(m)}{1+\xi_k(m)} \exp\left(\frac{1}{2}\int_{v_k}^{\infty} \frac{e^{-t}}{t} dt\right) \quad (3)$$

where:

$\xi_k(m)$ is a so-called a priori signal-to-noise ratio relating to the k-th spectral line and is defined as follows:

$$\xi_k(m) = \frac{|X_k(m)|^2}{|D_k(m)|^2} \quad (4)$$

$v_k(m)$ is defined as:

$$v_k(m) = \frac{\xi_k(m)}{1+\xi_k(m)} \gamma_k(m) \quad (5)$$

$\gamma_k(m)$ is a so-called a posteriori signal-to-noise ratio relating to the k-th spectral line and is defined as follows:

$$\gamma_k(m) = \frac{|Y_k(m)|^2}{|D_k(m)|^2} \quad (6)$$

Computation of the a posteriori signal-to-noise ratio $\gamma_k(m)$ requires the knowledge of the power spectrum $|D_k(m)|^2$ of the additive noise, which is not available. An estimate $|\hat{D}^*(m)|^2$ of the power spectrum of the additive noise can be obtained with a noise estimate as described in H. G. Hirsch, C. Ehrlicher, *Noise Estimation Techniques for Robust Speech Recognition*, ICASSP 1995, pp. 153-156.

Thus, an estimate $\hat{\gamma}_k(m)$ of the a posteriori signal-to-noise ratio may be computed as follows:

$$\hat{\gamma}_k(m) = \frac{|Y_k(m)|^2}{\left|\hat{D}_k(m)\right|^2} \quad (7)$$

Computation of the a priori signal-to-noise ratio $\xi_k(m)$ requires the knowledge of the power spectrum $|X_k(m)|^2$ of the clean speech, which is not available. An estimate $\hat{\xi}_k(m)$ of the a priori signal-to-noise ratio can be computed by using a decision-directed approach as described in Y. Ephraim and D. Malah, *Speech Enhancement Using a Minimum Mean-Square Error Short-Time Spectral Amplitude Estimator*, IEEE Trans. Acoustic, Speech, and Signal Processing, Vol. ASSP-32, Mo. 6, pp. 1109-1121, 1984, and as follows:

$$\hat{\xi}_k(m) = \eta(m)\frac{\left|\hat{X}_k(m-1)\right|^2}{\left|\hat{D}_k(m-1)\right|^2} + [1-\eta(m)]\max[0, \hat{\gamma}_k(m) - 1], \quad (8)$$

$$\eta(m) \in [0, 1)$$

where $\eta(m)$ is a weighting coefficient for appropriately weighting the two terms in the formula.

The Ephraim-Malah gain $G_k(m)$ may then be computed as a function of the estimate $\hat{\xi}_k(m)$ of the a priori signal-to-noise ratio and of the estimate $\hat{\gamma}_k(m)$ of the a posteriori signal-to-noise ratio according to formula (3).

An application of the Spectral Attenuation Technique is disclosed in US-A-2002/0002455, which relates to a speech enhancement system receiving noisy speech characterized by a spectral amplitude spanning a plurality of frequency bins and producing enhanced speech by modifying the spectral amplitude of the noisy speech without affecting the phase thereof. In particular, the speech enhancement system includes a core estimator that applies to the noisy speech one of a first set of gains for each frequency bin; a noise adaptation module that segments the noisy speech into noise-only and signal-containing frames, maintains a current estimate of the noise spectrum and an estimate of the probability of signal absence in each frequency bin; and a signal-to-noise ratio estimator that measures a posteriori signal-to-noise ratio and estimates a priori signal-to-noise ratio based on the noise estimate. Each one of the first set of gains is based on a priori signal-to-noise ratio, as well as the probability of signal absence in each bin and a level of aggression of the speech enhancement. A soft decision module computes a second set of gains that is based on a posteriori signal-to-noise ratio and a priori signal-to-noise ratio, and the probability of signal absence in each frequency bin.

Another application of the Spectral Attenuation Techniques is disclosed in WO-A-01/52242, which relates to a multi-band spectral subtraction scheme which can be applied to a variety of speech communication systems, such as hearing aids, public address systems, teleconference systems, voice control systems, or speaker phones, and which comprises a multi band filter architecture, noise and signal power detection, and gain function for noise reduction. The gain function for noise reduction consists of a gain scale function and a maximum attenuation function providing a predetermined amount of gain as a function of signal-to-noise ratio and noise. The gain scale function is a three-segment piecewise linear function, and the three piecewise linear sections of the gain scale function include a first section providing maximum expansion up to a first knee point for maximum noise reduction, a second section providing less expansion up to a second knee point for less noise reduction, and a third section providing minimum or no expansion for input signals with high signal-to-noise ratio to minimize distortion. The maximum attenuation function can either be a constant or equal to the estimated noise envelope. When used in hearing aid applications, the noise reduction gain function is combined with the hearing loss compensation gain function inherent to hearing aid processing.

Automatic speech recognition performed by using the known noise reduction methods described above is affected by some technical problems which prevents it from being really effective. In particular, Spectral Subtraction Technique and Wiener Spectral Subtraction Technique are affected by the so-called "musical noise", which is introduced in the power spectrum $|X_k(m)|^2$ of the clean speech by the aforementioned flooring, according to which negative values are set to a flooring value $\beta(m)|Y_k(m)|^2$ in order to avoid occurrence of negative subtraction results. In particular, the flooring introduces discontinuities in the spectrum that are perceived as annoying musical noises and degrade the performances of an automatic speech recognition system.

Spectral Attenuation Technique implementing the Ephraim-Malah attenuation rule is a very good technique for the so-called speech enhancement, i.e., noise reduction for a human listener, but it introduces some spectral distortion on voice parts that are acceptable for humans but very critical for an automatic speech recognition system.

OBJECT AND SUMMARY OF THE INVENTION

The aim of the present invention is therefore to provide a noise reduction method for automatic speech recognition and which, at the same time, reduces the musical noise in the power spectrum of the clean speech.

This aim is achieved by the present invention in that it relates to a noise reduction method for automatic speech recognition, as defined in claim 1, to an automatic speech recognition system, as defined in claim 12, and to a computer program product, as defined in claim 13.

The present invention meets the aforementioned needs as it makes use of a Spectral Attenuation Technique instead of a Spectral Subtraction Technique, thus removing the problem of musical noise, and the use of a modified Ephraim-Malah spectral attenuation rule implemented reduces the spectral distortion introduced by the original rule in the voice parts of the signals, thus obtaining better performances when used in an automatic speech recognition system.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

The present invention relates to an automatic speech recognition system including a noise reduction system based on the Spectral Attenuation Technique, and in particular on the Ephraim-Malah spectral attenuation rule, wherein the global formula of the gain $G_k(\gamma_k, \xi_k)$ is unchanged, whereas the estimates of the a priori and the a posteriori signal-to-noise ratios $\hat{\xi}_k(m)$, $\hat{\gamma}_k(m)$ are modified by making them dependent on a noise weighting factor $\alpha(m)$ and on a spectral flooring factor $\beta(m)$, as follows:

$$\hat{\gamma}_k(m) = \max\left(\frac{|Y_k(m)|^2}{\alpha(m)|\hat{D}_k(m)|^2} - 1, \beta(m)\right) + 1 \quad (9)$$

$$\hat{\xi}_k(m) = \max\left(\eta(m) \frac{|\hat{X}_k(m-1)|^2}{\alpha(m)|\hat{D}_k(m-1)|^2} + (1 - \eta(m))[\hat{\gamma}_k(m) - 1], \beta(m)\right), \quad (10)$$

$$\eta(m) \in [0, 1)$$

where:

$|Y_k(m)|^2$ is the k-th spectral line of the power spectrum of the noisy speech;

$|\hat{X}_k(m)|^2$ is the k-th spectral line of the estimate of the power spectrum of the clean speech;

$|\hat{D}_k(m)|^2$ is the k-th spectral line of the estimate of the power spectrum of the additive noise;

$\hat{\xi}_k(m)$ is the estimate of the a priori signal-to-noise ratio relating to the k-th spectral line;

$\hat{\gamma}_k(m)$ is the estimate of the a posteriori signal-to-noise ratio relating to the k-th spectral line;

$\alpha(m)$ is the noise weighting factor for weighting, namely overestimating or underestimating, the estimate $|\hat{D}^k(m)|^2$ of the power spectrum of the noise in the computation of the estimates $\hat{\xi}_k(m)$, $\hat{\gamma}_k(m)$ of the a priori and the a posteriori signal-to-noise ratios;

$\beta(m)$ is the spectral flooring factor for flooring the estimates $\hat{\xi}_k(m)$, $\hat{\gamma}_k(m)$ of the a priori and the a posteriori signal-to-noise ratios; and $\eta(m)$ is a weighting coefficient for appropriately weighting the two terms in formula (10).

The noise weighting factor $\alpha(m)$ and the spectral flooring factor $\beta(m)$ are a function of the global signal-to-noise ratio $SNR(m)$, which is defined as:

$$SNR(m) = 10\log_{10}\left(\frac{\sum_k |Y_k(m)|^2}{\sum_k |\hat{D}_k(m)|^2}\right) \quad (11)$$

Figure 3:
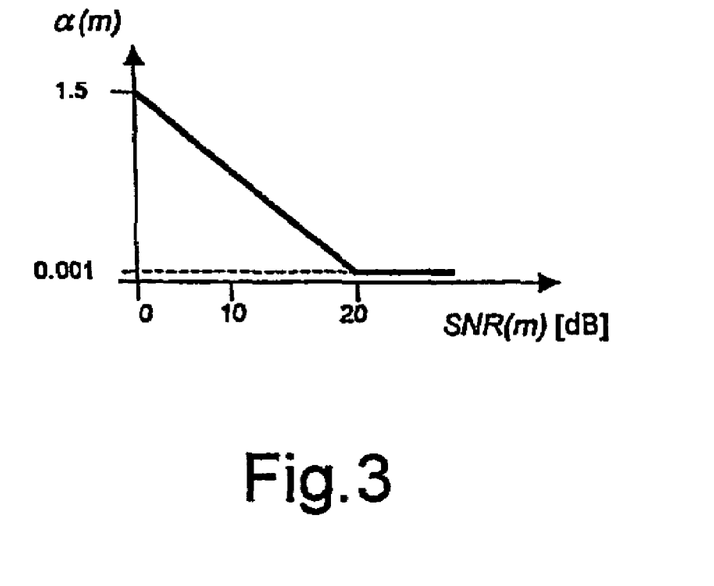
FIGS. 3 and 4 show plots of a noise overestimation factor and a spectral flooring factor as a function of a global signal-to-noise ratio and used in the noise reduction method according to the present invention.
Figure 4:
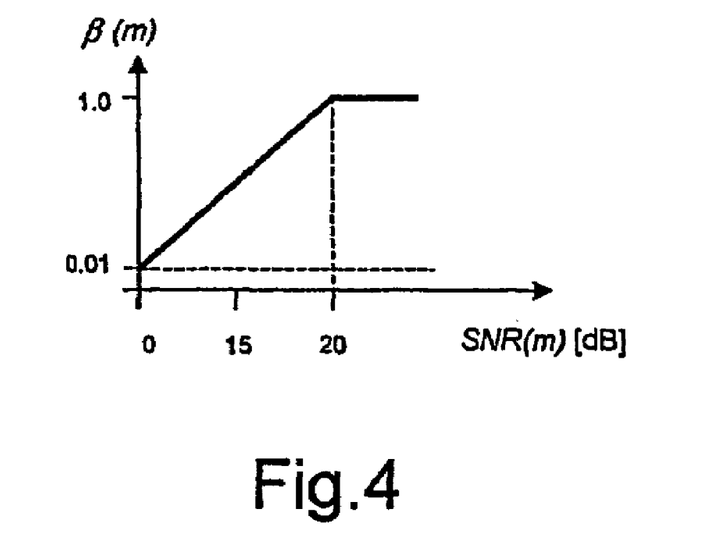

FIGS. 3 and 4 show a preferred development of the noise weighting factor $\alpha(m)$ and the spectral flooring factor $\beta(m)$ versus the global signal-to-noise ratio $SNR(m)$. The noise weighting factor $\alpha(m)$ and the spectral flooring factor $\beta(m)$ are piece-wise linear functions and may be mathematically defined as follows:

$$\alpha(m) = \begin{cases} 1.5 & \text{if } SNR(m) < 0 \\ 1.5 - \frac{(1.5 - 0.001)}{20} \cdot SNR(m) & \text{if } 0 \le SNR(m) \le 20 \\ 0.001 & \text{if } SNR(m) > 20 \end{cases} \quad (12)$$

$$\beta(m) = \begin{cases} 0.01 & \text{if } SNR(m) < 0 \\ \frac{(1.0 - 0.01)}{20} \cdot SNR(m) & \text{if } 0 \le SNR(m) \le 20 \\ 1.0 & \text{if } SNR(m) > 20 \end{cases} \quad (13)$$

The values indicated in formulas (12) and (13) are intended purely by way of example and are not to be construed as limiting. In general, other values could be usefully employed, while maintaining the general development of the noise weighting factor $\alpha(m)$ and of the spectral flooring factor $\beta(m)$ versus the global signal-to-noise ratio SNR(m).

In particular, the noise weighting factor $\alpha(m)$ versus the global signal-to-noise ratio SNR(m) should have a first substantially constant value when the global signal-to-noise ratio SNR(m) is lower than a first threshold, a second substantially constant value lower than the first substantially constant value when the global signal-to-noise ratio SNR(m) is higher than a second threshold, and values decreasing from the first substantially constant value to the second substantially constant value when the global signal-to-noise ratio SNR(m) increases from the first threshold to the second threshold.

The spectral flooring factor $\beta(m)$ versus the global signal-to-noise ratio SNR(m) should have a first substantially constant value when the global signal-to-noise ratio SNR(m) is lower than a first threshold, a second substantially constant value higher than the first substantially constant value when the global signal-to-noise ratio SNR(m) is higher than a second threshold, and values increasing from the first substantially constant value to the second substantially constant value when the global signal-to-noise ratio SNR(m) increases from the first threshold to the second threshold. The developments may be piece-wise lines, as shown in FIGS. 3 and 4, or may be continuous curved lines similar to those in FIGS. 3 and 4, i.e., curved lines wherein the intermediate non-constant stretch is linear, as in FIGS. 3 and 4, or curved, e.g., a cosine-like or a sine-like curve, and transitions from the intermediate non-constant stretch to the constant stretches is rounded or smoothed.

The estimate $|\hat{D}_k(m)|^2$ of the power spectrum of the noisy speech in formulas (9), (10) and (11) is computed by means of a first-order recursion as disclosed in the aforementioned Noise Estimation Techniques for Robust Speech Recognition.

Preferably, the first-order recursion may be implemented in conjunction with a standard energy-based Voice Activity Detector, which is well-known system which detects presence or absence of speech based on a comparison of the total energy of the speech signal with an adaptive threshold and outputs a Boolean flag (VAD) having a "true" value when voice is present and a "false" value when voice is absent. When a standard energy-based Voice Activity Detector is used, the estimate $|\hat{D}_k(m)|^2$ of the power spectrum of the noisy speech may be computed as follows:

$$|\hat{D}_k(m)|^2 = \begin{cases} \lambda|\hat{D}_k(m-1)|^2 + (1-\lambda)|Y_k(m)|^2 & \text{if } \{||Y_k(m)|^2 - |\hat{D}_k(m)|^2| \\ & \le \mu\sigma(m)\} \wedge \{VAD = \text{false}\} \\ |\hat{D}_k(m-1)|^2 & \text{otherwise} \end{cases} \quad (14)$$

where $\lambda$ is a weighting factor which controls the update speed of the recursion and ranges between 0 and 1, preferably has a value of 0.9, $\mu$ is a multiplication factor which controls the allowed dynamics of the noise and preferably has a value of 4.0, and $\sigma(m)$ is the noise standard deviation, estimated as follows:

$$\sigma^2(m) = \lambda\sigma^2(m-1) + (1-\lambda)(|Y_k(m)|^2 - |\hat{D}_k(m)|^2)^2 \quad (15)$$

Figure 5:
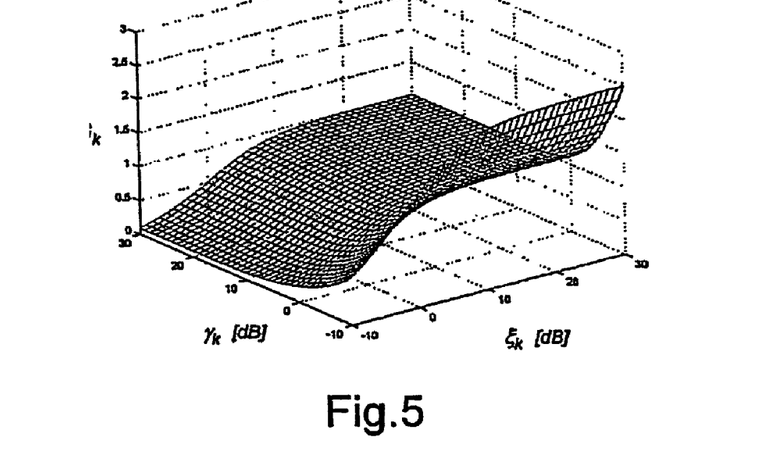
FIG. 5 shows a standard Ephraim-Malah spectral attenuation rule.
Figure 6:
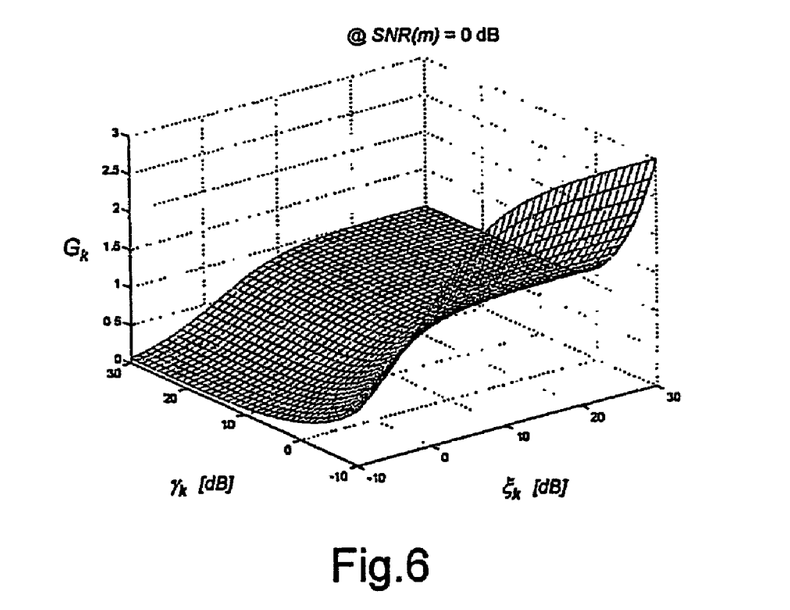
FIGS. 6-10 show a modified Ephraim-Malah spectral attenuation rule according to the present invention at different global signal-to-noise ratio.
Figure 7:
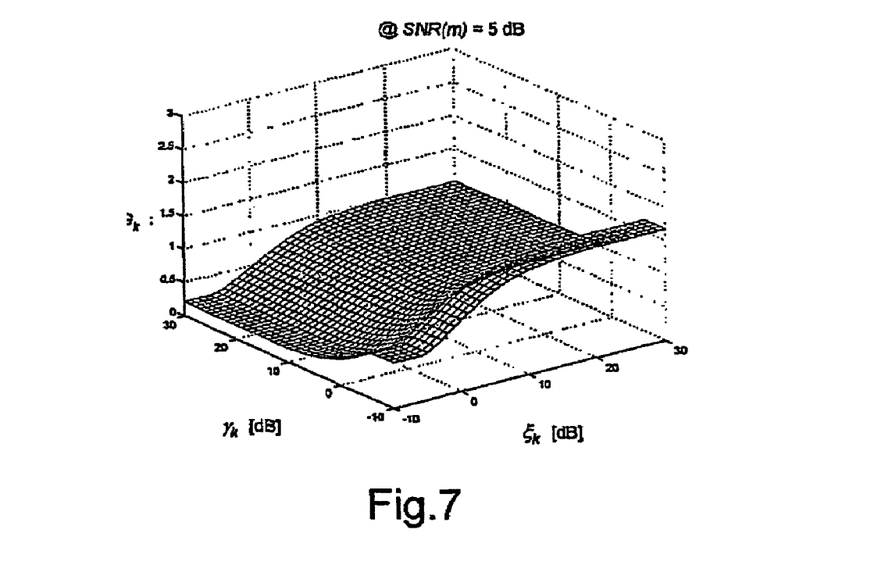
Figure 8:
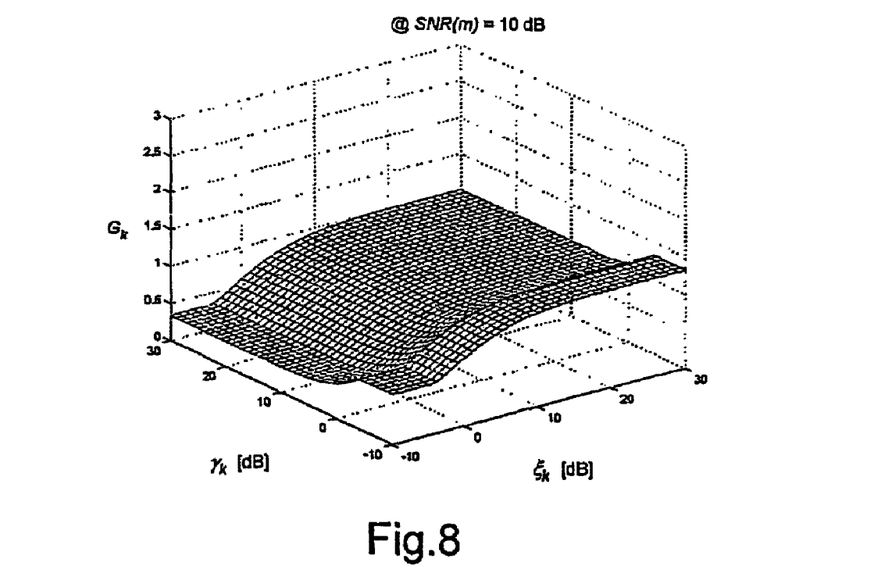
Figure 9:
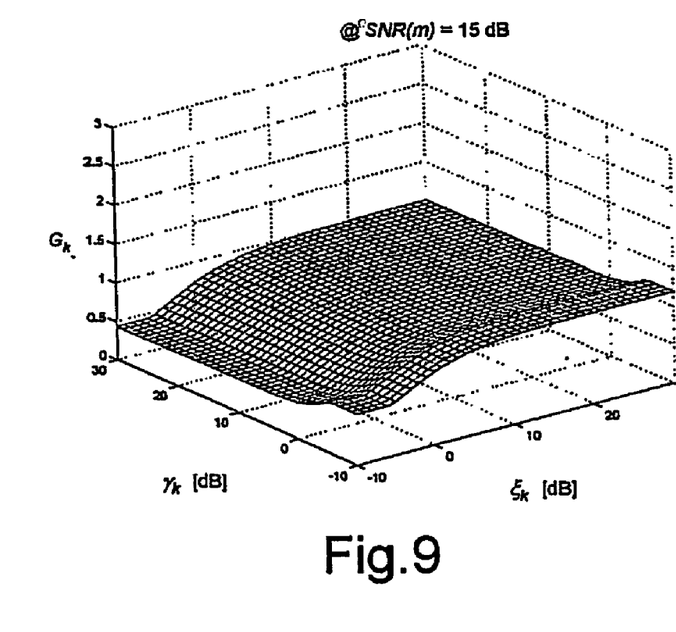
Figure 10:
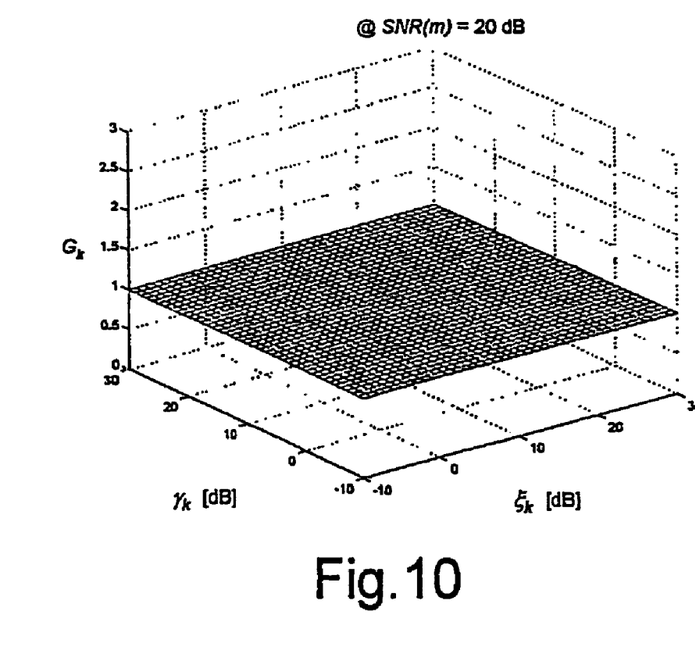

FIG. 5 shows the standard Ephraim-Malah spectral attenuation rule ($G_k$, $\xi_k(m)$ and $\gamma_k(m)$ computed according to formulas (3), (7) and (8)), whereas FIGS. 6-10 show the modified Ephraim-Malah spectral attenuation rule according to the present invention ($G_k$, $\xi_k(m)$ and $\gamma_k(m)$ computed according to formulas (3), (10) and (9)) at different global signal-to-noise ratios SNR(m) (0, 5, 10, 15 and 20 dB). It may be appreciated by the skilled person that the effect of the introduced modification is a gradual reduction of the attenuation produced by the original gain in areas where the a posteriori $\gamma_k(m)$ signal-to-noise ratios is high, as the global signal-to-noise ratios SNR(m) increases.

A large experimental work has been performed to validate the invention, and some results, which may be useful to highlight the features of the invention, are hereinafter reported.

In particular, experiments were conducted with an automatic speech recognition system, using noise reduction with the standard Ephraim-Malah spectral attenuation and with the noise reduction proposed in the invention. The automatic speech recognition system has been trained for the target languages using large, domain and task independent corpora, not collected in noisy environments and without added noise.

The experiment was performed on the Aurora3 corpus, that is a standard corpus defined by the ETSI Aurora Project for noise reduction tests, and made of connected digits recorded in car in several languages (Italian, Spanish and German). An high mismatch test set and a noisy component of the training set (used as test set) were employed.

The modification of the Ephraim-Malah spectral attenuation rule according to the invention produces an average error reduction of 28.9% with respect to the state of the art Wiener Spectral Subtraction, and an average error reduction of 22.9% with respect to the standard Ephraim-Malah Spectral Attenuation Rule. The average error reduction with respect to no de-noising is 50.2%.

Finally, it is clear that numerous modifications and variants can be made to the present invention, all falling within the scope of the invention, as defined in the appended claims.

The invention claimed is:

1. A noise reduction method for automatic speech recognition, including:
   computing a magnitude spectrum ($|Y_k(m)|$) of a noisy speech containing a clean speech to be recognized and noise affecting the clean speech;
   computing a power spectrum ($|Y_k(m)|^2$) of the noisy speech;
   computing an estimate ($|\hat{X}_k(m)|^2$) of a power spectrum of the clean speech;
   computing an estimate ($|\hat{D}_k(m)|^2$) of a power spectrum of the noise;
   computing an estimate ($\hat{\xi}_k(m)$) of an a priori signal-to-noise ratio as a function of the estimate ($|\hat{X}_k(m)|^2$) of the power spectrum of the clean speech and the estimate ($|\hat{D}_k(m)|^2$) of the power spectrum of the noise;
   computing an estimate ($\hat{\gamma}_k(m)$) of an a posteriori signal-to-noise ratio as a function of the power spectrum ($|Y_k(m)|^2$) of the noisy speech and the estimate ($|\hat{D}_k(m)|^2$) of the power spectrum of the noise;
   computing an attenuation gain ($G_k(m)$) as a function of the estimate ($\hat{\xi}_k(m)$) of the a priori signal-to-noise ratio and the estimate ($\hat{\gamma}_k(m)$) of the a posteriori signal-to-noise ratio;
   computing an estimate ($|\hat{X}_k(m)|$) of a magnitude spectrum of the clean speech as a function of the magnitude spectrum ($|Y_k(m)|$) of the noisy speech and the attenuation gain ($G_k(m)$);
   characterized in that computing the estimates ($\hat{\xi}_k(m)$, $\hat{\gamma}_k(m)$) of the a priori and the a posteriori signal-to-noise ratios includes:
   computing a noise weighting factor ($\alpha(m)$) for weighting the estimate ($|\hat{D}_k(m)|^2$) of the power spectrum of the noise in the computation of the estimates ($\hat{\xi}_k(m)$, $\hat{\gamma}_k(m)$) of the a priori and the a posteriori signal-to-noise ratios;
   computing a spectral flooring factor ($\beta(m)$) for flooring the estimates ($\hat{\xi}_k(m)$, $\hat{\gamma}_k(m)$) of the a priori and the a posteriori signal-to-noise ratios; and
   computing the estimates ($\hat{\xi}_k(m)$, $\hat{\gamma}_k(m)$) of the a priori and the a posteriori signal-to-noise ratios also as a function of the noise weighting factor ($\alpha(m)$) and the spectral flooring factor ($\beta(m)$).

2. A noise reduction method as claimed in claim 1, wherein the noise weighting factor ($\alpha(m)$) and the spectral flooring factor ($\beta(m)$) are computed as a function of a global signal-to-noise ratio (SNR(m)).

3. A noise reduction method as claimed in claim 2, wherein the noise weighting factor ($\alpha(m)$) versus the global signal-to-noise ratio (SNR(m)) has a first substantially constant value when the global signal-to-noise ratio (SNR(m)) is lower than a first threshold, a second substantially constant value lower than the first substantially constant value when the global signal-to-noise ratio (SNR(m)) is higher than a second threshold, and decreasing values when the global signal-to-noise ratio (SNR(m)) ranges between the first and the second thresholds.

4. A noise reduction method as claimed in claim 3, wherein the noise weighting factor ($\alpha(m)$) decreases linearly when the global signal-to-noise ratio (SNR(m)) ranges between the first and the second thresholds.

5. A noise reduction method as claimed in claim 2, wherein the spectral flooring factor ($\beta(m)$) versus the global signal-to-noise ratio (SNR(m)) has a first substantially constant value when the global signal-to-noise ratio (SNR(m)) is lower than a first threshold, a second substantially constant value higher than the first substantially constant value when the global signal-to-noise ratio (SNR(m)) is higher than a second threshold, and increasing values when the global signal-to-noise ratio (SNR(m)) ranges between the first and the second thresholds.

6. A noise reduction method as claimed in claim 5, wherein the spectral flooring factor ($\beta(m)$) increases linearly when the global signal-to-noise ratio (SNR(m)) ranges between the first and the second thresholds.

7. A noise reduction method as claimed in claim 1, wherein the estimate ($\hat{\gamma}_k(m)$) of the a posteriori signal-to-noise ratio is computed as follows:

$$\hat{\gamma}_k(m) = \max\left(\frac{|Y_k(m)|^2}{\alpha(m)|\hat{D}_k(m)|^2} - 1, \beta(m)\right) + 1$$

wherein:
$\hat{\gamma}_k(m)$ is the estimate of the a posteriori signal-to-noise ratio for the k-th spectral line;
$|Y_k(m)|^2$ is the k-th spectral line of the power spectrum of the noisy speech;
$|\hat{D}_k(m)|^2$ is the k-th spectral line of the estimate of the power spectrum of the noise;
$\alpha(m)$ is the noise weighting factor;
$\beta(m)$ is the spectral flooring factor;
k indexes spectral lines of the spectra; and
m indexes time windows within which the noisy speech is processed for noise reduction.

8. A noise reduction method as claimed in claim 1, wherein the estimate ($\hat{\xi}_k(m)$) of the a priori signal-to-noise ratio is computed as follows:

$$\hat{\xi}_k(m) = \max\left(\eta\frac{|\hat{X}_k(m-1)|^2}{\alpha(m)|\hat{D}_k(m-1)|^2} + (1-\eta)[\hat{\gamma}_k(m)-1], \beta(m)\right),$$

$$\eta(m) \in [0, 1)$$

wherein:
$\hat{\xi}_k(m)$ is the estimate of the a priori signal-to-noise ratio for the is k-th spectral line;
$\hat{\gamma}_k(m)$ is the estimate of the a posteriori signal-to-noise ratio for the k-th spectral line of the power spectrum of the noisy speech;
$|\hat{X}_k(m)|^2$ is the k-th spectral line of the estimate of the power spectrum of the clean speech;
$|\hat{D}_k(m)|^2$ is the k-th spectral line of the estimate of the power spectrum of the noise;
$\alpha(m)$ is the noise weighting factor;
$\beta(m)$ is the spectral flooring factor;
k indexes spectral lines of the spectra; and
m indexes time windows within which the noisy speech is processed for noise reduction.

9. A noise reduction method as claimed in claim 1, wherein the attenuation gain ($G_k(m)$) is computed as follows:

$$G_k(m) = \frac{\hat{\xi}_k(m)}{1+\hat{\xi}_k(m)} \exp\left(\frac{1}{2}\int_{v_k}^{\infty} \frac{e^{-t}}{t} dt\right)$$

wherein:
$G_k(m)$ is the Ephraim-Malah gain for the k-th spectral line;
$\hat{\xi}_k(m)$ is the estimate of the a priori signal-to-noise ratio for the k-th spectral line;
$\hat{\gamma}_k(m)$ is the estimate of the a posteriori signal-to-noise ratio for the k-th spectral line;

$$v_k(m) = \frac{\hat{\xi}_k(m)}{1+\hat{\xi}_k(m)} \hat{\gamma}_k(m)$$

k indexes spectral lines of the spectra; and
m indexes time windows within which the noisy speech is processed for noise reduction.

10. A noise reduction method as claimed in claim 1, wherein the estimate $(|\hat{D}_k(m)|^2$ of the power spectrum of the noise is computed as follows:

$$|\hat{D}_k(m)|^2 = \begin{cases} \lambda|\hat{D}_k(m-1)|^2 + (1-\lambda)|Y_k(m)|^2 & \text{if } \{||Y_k(m)|^2 - |\hat{D}_k(m)|^2| \\ & \leq \mu\sigma(m)\} \wedge \{VAD = \text{false}\} \\ |\hat{D}_k(m-1)|^2 & \text{otherwise} \end{cases}$$

where:
$|\hat{D}_k(m)|^2$ is the k-th spectral line of the estimate of the power spectrum of the noise;
$|Y_k(m)|^2$ is the k-th spectral line of the power spectrum of the noisy speech;
$\lambda$ is a weighting factor which controls the update speed of the recursion,
$\mu$ is a multiplication factor which controls the allowed dynamics of the noise, and
$\sigma(m)$ is the noise standard deviation, estimated as follows:

$$\sigma^2(m) = \lambda\sigma^2(m-1) + (1-\lambda(|Y_k(m)|^2 - |\hat{D}_k(m)|^2)^2$$

11. A noise reduction method as claimed in claim 2, wherein the global signal-to-noise ratio (SNR(m)) is computed as follows:

$$SNR(m) = 10\log_{10}\left(\frac{\sum_k |Y_k(m)|^2}{\sum_k |\hat{D}_k(m)|^2}\right)$$

where:
SNR(m) is the global signal-to-noise ratio;
$|\hat{D}_k(m)|^2$ is the k-th spectral line of the estimate of the power spectrum of the noise; and
$|Y_k(m)|^2$ is the k-th spectral line of the power spectrum of the noisy speech.

12. An automatic speech recognition system including a noise reduction system configured to implement the method according to claim 1.

13. A computer program product comprising a computer program code able, when loaded in a processing system, to implement the method according to claim 1.

* * * * *

UNITED STATES PATENT AND TRADEMARK OFFICE
CERTIFICATE OF CORRECTION

PATENT NO. : 7,376,558 B2
APPLICATION NO. : 11/598705
DATED : May 20, 2008
INVENTOR(S) : Gemello et al.

It is certified that error appears in the above-identified patent and that said Letters Patent is hereby corrected as shown below:

Title page, item (57) Abstract, line 2, "recognition1." should read --recognition.--.

Claim 8, column 10, line 51, "the is k-th" should read --the k-th--.

Claim 10, column 11, line 24, " $(|\hat{D}_k(m)|^2$ " should read --$(|\hat{D}_k(m)|^2)$--.

Claim 10, column 12, line 9, " $\sigma^2(m)=\lambda\sigma^2(m-1)+(1-\lambda(|Y_k(m)|^2-|\hat{D}_k(m)|^2)^2$ " should read -- $\sigma^2(m)=\lambda\sigma^2(m-1)+(1-\lambda)(|Y_k(m)|^2-|\hat{D}_k(m)|^2)^2$ --.

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,376,558 B2 Page 1 of 1
APPLICATION NO. : 11/598705
DATED : May 20, 2008
INVENTOR(S) : Gemello et al.

It is certified that error appears in the above-identified patent and that said Letters Patent is hereby corrected as shown below:

On Title Page add the following:

"Related U.S. Application Data

(63)  Continuation of application No. PCT/EP2004/050816, filed on May 14, 2004."

Signed and Sealed this

Ninth Day of February, 2010

David J. Kappos
*Director of the United States Patent and Trademark Office*